(12) United States Patent
Geng et al.

(10) Patent No.: US 9,902,637 B2
(45) Date of Patent: Feb. 27, 2018

(54) METHOD FOR DEGRADING ARTIFICIAL SWEETENERS FROM SEWAGE

(71) Applicant: Nanjing University, Nanjing (CN)

(72) Inventors: Jinju Geng, Nanjing (CN); Yuhang Ren, Nanjing (CN); Hongqiang Ren, Nanjing (CN); Ke Xu, Nanjing (CN); Lili Ding, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 15/390,526

(22) Filed: Dec. 25, 2016

(65) Prior Publication Data

US 2017/0267564 A1 Sep. 21, 2017

(30) Foreign Application Priority Data

Mar. 21, 2016 (CN) .......................... 2016 1 0156280

(51) Int. Cl.
*C02F 1/52* (2006.01)
*C02F 9/00* (2006.01)
(Continued)

(52) U.S. Cl.
CPC ............... *C02F 9/00* (2013.01); *C02F 1/325* (2013.01); *C02F 1/66* (2013.01); *C02F 1/722* (2013.01);
(Continued)

(58) Field of Classification Search
CPC .... C02F 9/00; C02F 2101/34; C02F 2101/38; C02F 2101/40; C02F 2001/007; C02F 2305/10; C02F 1/722; C02F 1/725; C02F 1/325; C02F 2303/04; C02F 1/66; C02F 1/52; C02F 1/24; C02F 1/5236; C02F 3/20; B01D 21/01; B01D 21/02; B01D 21/10;
(Continued)

(56) References Cited

U.S. PATENT DOCUMENTS

| | | | |
|---|---|---|---|
| 2009/0166276 A1* | 7/2009 | Abe | B01D 61/18 210/138 |
| 2016/0046507 A1* | 2/2016 | Deguchi | C02F 1/325 250/432 R |

FOREIGN PATENT DOCUMENTS

CN 105967392 A * 9/2016

* cited by examiner

*Primary Examiner* — Walter D. Griffin
*Assistant Examiner* — Cameron J Allen
(74) *Attorney, Agent, or Firm* — Matthias Scholl, PC; Matthias Scholl

(57) ABSTRACT

A method for degrading artificial sweeteners from sewage, the method including: 1) introducing sewage to a secondary sedimentation tank and precipitating sediments; 2) collecting a supernatant from the secondary sedimentation tank, adding a NaOH solution or a perchloric acid solution to regulate the pH; adding an $H_2O_2$ solution to the supernatant to adjust a ratio of a molar concentration of $H_2O_2$ to a molar concentration of the sweetener in the resulting mixed solution to be between 1:1 and 30:1; transferring the resulting mixed solution to a photoreactor, irradiating the mixed solution by ultraviolet light, and stirring the mixed solution for between 5 and 30 min; and adding a 1.5% w/w aqueous $NaNO_2$ solution to the mixed solution; and 3) collecting and analyzing an effluent obtained from 2), contacting the effluent with $ClO_2$ for reaction in a disinfecting tank, and discharging the product.

7 Claims, 2 Drawing Sheets

(51) Int. Cl.
    *C02F 101/34*     (2006.01)
    *C02F 101/38*     (2006.01)
    *C02F 1/00*     (2006.01)
    *C02F 1/66*     (2006.01)
    *C02F 1/72*     (2006.01)
    *C02F 1/32*     (2006.01)

(52) U.S. Cl.
    CPC ........ *C02F 1/725* (2013.01); *C02F 2001/007* (2013.01); *C02F 2101/34* (2013.01); *C02F 2101/38* (2013.01); *C02F 2101/40* (2013.01); *C02F 2303/04* (2013.01); *C02F 2305/10* (2013.01)

(58) Field of Classification Search
    CPC ............ B01D 21/2433; B01D 21/2444; B01D 21/2488; B01D 53/84; B01F 3/04836; B01F 3/0876; B01F 5/0212; B01F 5/106; B03D 1/24; Y10S 210/906; Y10S 210/916; Y10S 210/919
    See application file for complete search history.

METHOD FOR DEGRADING ARTIFICIAL SWEETENERS FROM SEWAGE

CROSS-REFERENCE TO RELATED APPLICATIONS

Pursuant to 35 U.S.C. §119 and the Paris Convention Treaty, this application claims the benefit of Chinese Patent Application No. 201610156280.4 filed Mar. 21, 2016, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for degrading artificial sweeteners from sewage by advanced oxidation processes.

Description of the Related Art

Conventional wastewater treatment includes: active carbon absorption, coagulating sedimentation, chlorine disinfection, ultraviolet disinfection, and ozone-based advanced oxidation processes. However, all these processes consume a relatively large amount of materials and are inefficient in degrading artificial sweeteners.

SUMMARY OF THE INVENTION

In view of the above-described problems, it is one objective of the invention to provide a method for degrading artificial sweeteners from sewage by advanced oxidation processes that is efficient in degrading acesulfame potassium, sucralose, cyclamate, and saccharin sodium.

To achieve the above objective, in accordance with one embodiment of the invention, there is provided a method for degrading artificial sweeteners from sewage by advanced oxidation processes. The method comprises:

1) allowing sewage to flow in a secondary sedimentation tank by gravity, and precipitating sediments of the sewage in the secondary sedimentation tank;
2) collecting a supernatant from the secondary sedimentation tank, adding a NaOH solution or a perchloric acid solution as a pH regulator to regulate a pH value of the supernatant to be between 3 and 11; adding a 30% w/w aqueous $H_2O_2$ solution to the supernatant to adjust a ratio of a molar concentration of $H_2O_2$ to a molar concentration of the sweetener to be between 1:1 and 30:1; transferring the resulting mixed solution to a photoreactor, irradiating the mixed solution by ultraviolet light having a working power of 22 or 300 Watt, and stirring the mixed solution for between 5 and 30 min; and adding a 1.5% w/w aqueous $NaNO_2$ solution to the mixed solution to terminate the reaction; and
3) collecting and analyzing an effluent obtained from 2), introducing the effluent to a disinfecting tank and disinfecting the effluent with $ClO_2$, and discharging an effluent from the disinfecting tank to an urban sewage system.

In a class of this embodiment, the photoreactor of 2) is made of organic glass outside; a quartz sleeve is vertically disposed in a center of the photoreactor; and an ultraviolet lamp is placed in the quartz sleeve for irradiation.

In a class of this embodiment, a mercury lamp having a working power of 22 Watt is adopted in 2), and a radiation intensity of the ultraviolet light at a wavelength of 254 nm on an outer wall of the quartz sleeve is 0.52 µW/cm².

In a class of this embodiment, in 2), concentrations of the NaOH solution and the perchloric acid solution each are 0.5 mol/L.

In a class of this embodiment, in 2), the pH value of the supernatant is initially regulated to be 5.

In a class of this embodiment, in 2), the ratio of a molar concentration of $H_2O_2$ to a molar concentration of the sweetener in the mixed solution is 20:1.

In a class of this embodiment, in 2), the mixed solution is stirred under the ultraviolet light for 30 min.

Advantages of the method for degrading the artificial sweeteners from sewage by the advanced oxidation processes according to embodiments of the invention are summarized as follows: the ultraviolet-based advanced oxidation processes process is adopted in the method of the invention. By catalytic decomposing some oxidants, hydroxyl radicals (.OH) having strong oxidizability are produced to decompose or mineralize multiple pollutants in the sewage, thus, artificial sweeteners are efficiently removed from the sewage, the sewage discharge satisfies the requirement.

BRIEF DESCRIPTION OF THE DRAWINGS

The invention is described hereinbelow with reference to the accompanying drawings, in which.

DETAILED DESCRIPTION OF THE EMBODIMENTS

Figure 1:
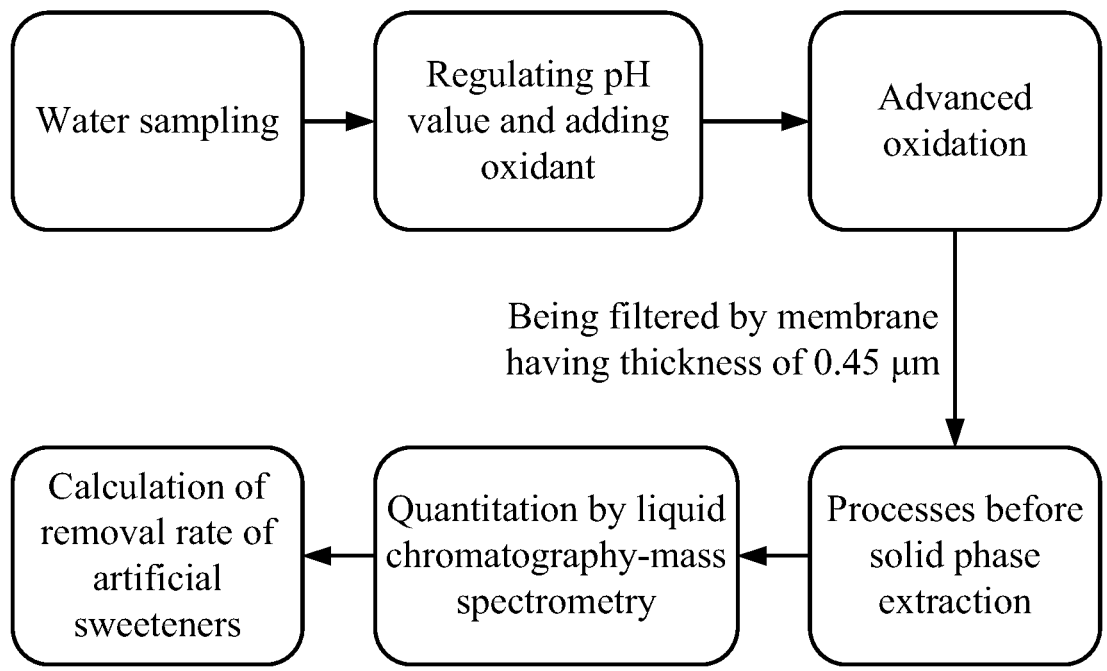
FIG. 1 is a flow chart of analysis of treatment results in accordance with one embodiment of the invention.

For further illustrating the invention, experiments detailing a method for degrading artificial sweeteners from sewage by advanced oxidation processes are described below. It should be noted that the following examples are intended to describe and not to limit the invention.

Example 1

Secondary biological effluent from a municipal sewage treatment plant in Nanjing was taken as an example. A method for degrading artificial sweeteners from sewage by advanced oxidation processes was conducted as follows:

1) Sewage was introduced to a secondary sedimentation tank under the action of gravity to precipitate sediments of the sewage in the secondary sedimentation tank.

2) A supernatant was collected from the secondary sedimentation tank and added with a NaOH solution or a perchloric acid solution as a pH regulator to regulate a pH value of the supernatant to be between 3 and 11. A concentration of the NaOH solution or the perchloric acid solution was 0.5 mol/L. Thereafter, a 30% w/w aqueous $H_2O_2$ solution was added to the supernatant to adjust a ratio of a molar concentration of $H_2O_2$ to a molar concentration of the sweetener in a resulting mixed solution to be 10:1. The resulting mixed solution was transferred to a photoreactor for photoreaction, during which, the mixed solution was electromagnetically stirred and irradiated by an ultraviolet light in the photoreactor for 30 min at a working power of 22 Watt. The UV irradiation was realized by using an ultraviolet lamp, and an irradiation intensity of the ultraviolet was 0.52 μW/cm$^2$ at a wavelength of 254 nm on an outer wall of a quartz sleeve. Finally, a 1.5% w/w aqueous NaNO$_2$ solution was added to the mixed solution to terminate the photo reaction.

3) A sample was collected from an effluent obtained from 2) for analyzing treatment results, the effluent was introduced to a disinfecting tank and disinfecting the effluent with ClO$_2$, and an effluent was discharged from the disinfecting tank to an urban sewage system.

Example 2

Secondary biological effluent from a municipal sewage treatment plant in Nanjing was taken as an example. A method for degrading artificial sweeteners from sewage by advanced oxidation processes was conducted as follows:

1) Sewage was introduced to a secondary sedimentation tank under the action of gravity to precipitate sediments of the sewage in the secondary sedimentation tank.

2) A supernatant was collected from the secondary sedimentation tank and added with a NaOH solution or a perchloric acid solution as a pH regulator to regulate a pH value of the supernatant to be 5. A concentration of the NaOH solution or the perchloric acid solution was 0.5 mol/L. Thereafter, a 30% w/w aqueous H$_2$O$_2$ solution was added to the supernatant to adjust a ratio of a molar concentration of H$_2$O$_2$ to a molar concentration of the sweetener in a resulting mixed solution to be between 1:1 and 30:1, in the meanwhile, active carbon fibers according to an addition of 150 mg/L were added. A resulting mixture was transferred to a photoreactor for photoreaction, during which, the mixed solution was electromagnetically stirred and irradiated by an ultraviolet light in the photoreactor for 30 min at a working power of 22 Watt. The UV irradiation was realized by using an ultraviolet lamp, and an irradiation intensity of the ultraviolet was 0.52 μW/cm$^2$ at a wavelength of 254 nm on an outer wall of a quartz sleeve. Finally, a 1.5% w/w aqueous NaNO$_2$ solution was added to the mixture to terminate the photo reaction.

3) A sample was collected from an effluent obtained from 2) for analyzing treatment results, the effluent was introduced to a disinfecting tank and disinfecting the effluent with ClO$_2$, and an effluent was discharged from the disinfecting tank to an urban sewage system.

Example 3

Secondary biological effluent from a municipal sewage treatment plant in Nanjing was taken as an example. A method for degrading artificial sweeteners from sewage by advanced oxidation processes was conducted as follows:

1) Sewage was introduced to a secondary sedimentation tank under the action of gravity to precipitate sediments of the sewage in the secondary sedimentation tank.

2) A supernatant was collected from the secondary sedimentation tank and added with a NaOH solution or a perchloric acid solution as a pH regulator to regulate a pH value of the supernatant to be 5. A concentration of the NaOH solution or the perchloric acid solution was 0.5 mol/L. Thereafter, a 30% w/w aqueous H$_2$O$_2$ solution was added to the supernatant to adjust a ratio of a molar concentration of H$_2$O$_2$ to a molar concentration of the sweetener in a resulting mixed solution to be 10:1. The resulting mixed solution was transferred to a photoreactor for photoreaction, during which, the mixed solution was electromagnetically stirred and irradiated by an ultraviolet light in the photoreactor for 30 min at a working power of 22 Watt or 300 Watt. The UV irradiation was realized by using an ultraviolet lamp, and an irradiation intensity of the ultraviolet was 0.52 μW/cm$^2$ at a wavelength of 254 nm on an outer wall of a quartz sleeve. Finally, a 1.5% w/w aqueous NaNO$_2$ solution was added to the mixed solution to terminate the photo reaction.

3) A sample was collected from an effluent obtained from 2) for analyzing treatment results, the effluent was introduced to a disinfecting tank and disinfecting the effluent with ClO$_2$, and an effluent was discharged from the disinfecting tank to an urban sewage system.

It should be noted that ranges of the data involved in the embodiments can be realized and herein the specific data at the end values and the intermediate values are not respectively exemplified herein.

Results Analyses 50 mL of a water sample was collected and filtered by a mixed fiber membrane having a thickness of 0.22 μm. A filtrate was then stored in a 4° C. refrigerator for subsequent solid phase extraction and quantitative detection of the artificial sweeteners. Each experiment was repeated for three times and a mean value±a standard deviation was analyzed. Simple experiment process is shown in FIG. 1.

A) Purification of Four Artificial Sweeteners

A weak anion exchange column CNW Poly-Sery PWAX (60 mg, 3 mL) provided by ANPEL scientific instrument (Shanghai) Co., Ltd was selected as a solid phase extraction column. Specific steps were as follows:

a) 6 mL of methanol was used to balance the CNW Poly-Sery PWAX column.

b) The CNW Poly-Sery PWAX column was washed by 6 mL of a solution comprising acetic acid and sodium acetate having a concentration of 25 mM and a pH value of 4.

c) 50 mL of a water sample was enabled to pass through the CNW Poly-Sery PWAX column at a rate of between 2 and 3 mL/min.

d) The CNW Poly-Sery PWAX column was washed again by 6 mL of the solution comprising acetic acid and sodium acetate having the concentration of 25 mM and the pH value of 4.

e) The sweeteners were eluted by 6 mL of a methanol solution comprising 1 mM of TRIS, a resulting solution comprising the sweeteners and methanol was then blown with nitrogen gas to a constant volume of 1 mL, and stored in the 4° C. refrigerator for subsequent detection by machine.

B) Detection of Concentration of Sweeteners by Liquid Chromatography-Mass Spectrometry Xevo TQ-S UPLC-MS provided by Waters corporation from the USA was adopted as the liquid chromatography-mass spectrometry instrument. And the concentrations of the sweeteners were analyzed by multi-reaction monitoring mode with negative electrospray ionization.

TABLE 1

Multi-reaction monitoring parameters of artificial sweeteners

| Compound | Parent ion (m/z) | Daughter-ion (m/z) | Cone Voltage (V) | Collision energy (V) |
|---|---|---|---|---|
| Acesulfame potassium | 162 | 82/78 | 38 | 14/18 |
| Cyclamate | 178 | 80 | 60 | 28 |
| Saccharin sodium | 182 | 106/42 | 55 | 16/26 |
| Sucralose | 395 | 359/35 | 70 | 10 |

Acquity UPLC BEH C18 chromatographic column (2.1× 50 mm, 1.7 μm) was adopted in the liquid phase separation. A temperature of the column was maintained at 30° C. Mobile phases were water (A) and acetonitrile (B). Both the two phases were added with 5 mM ammonium acetate and 1 mM TRIS. The mobile phases were removed from gas by ultrasonic wave. A flow rate of the mobile phases was 0.1 mL/min. Gradient elution was adopted and the procedure for the gradient elution was illustrated in Table 2. An injection volume was 20 μL, and the sample was injected by an automatic sample injector.

TABLE 2

Procedure for gradient elution

| Time | Flow rate (mL/min) | Mobile phase A (%) | Mobile phase B (%) |
|---|---|---|---|
| 0 | 0.1 | 95 | 5 |
| 4.5 | 0.1 | 30 | 70 |
| 5 | 0.1 | 95 | 5 |
| 6 | 0.1 | 95 | 5 |

C) Analysis of Removal Rate of Sweeteners

Concentration unit of the artificial sweeteners were μg/L.

The removal rate of the sweeteners=$(1-C_t/C_0)\times 100\%$, in which $C_0$ is an original concentration, $C_t$ is a concentration of a sweetener at a photoreaction time t. Artificial sweeteners detected included acesulfame potassium, sucralose, cyclamate, and saccharin sodium.

Analysis Results

1. Influence of the Original pH Value on Removal Rate of Target Pollutants

Figure 2:
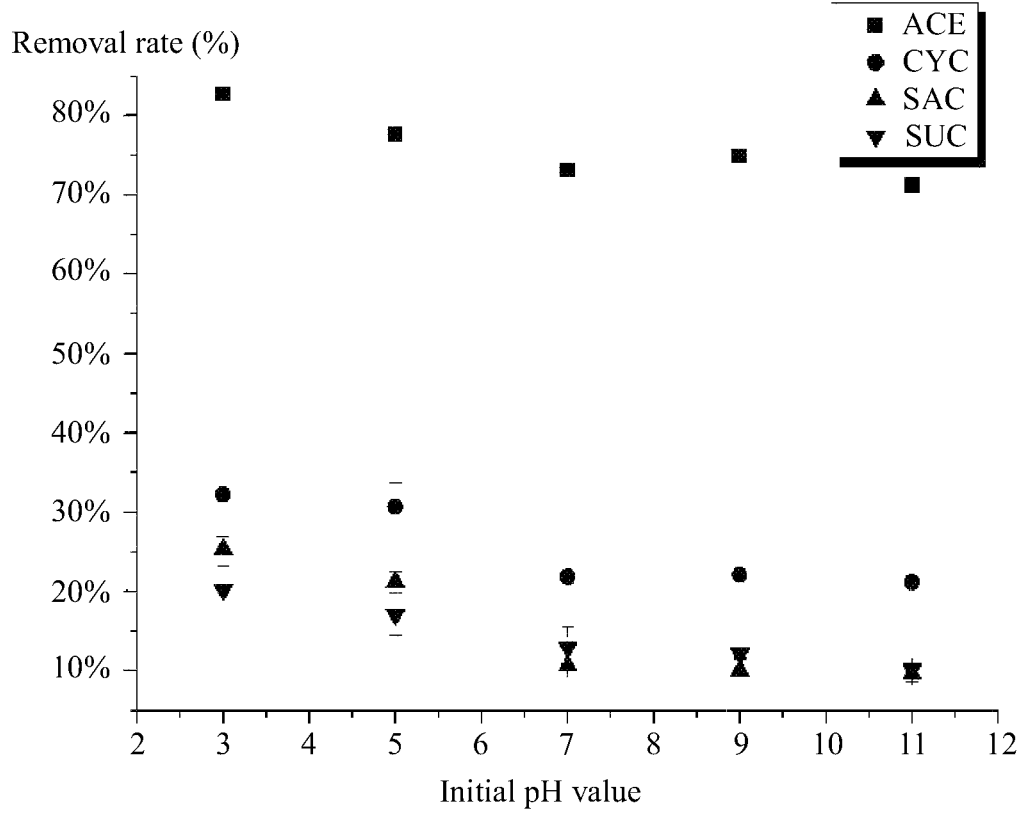
FIG. 2 illustrates influences of an original pH value on degradation effects of sweeteners in accordance with one embodiment of the invention.

FIG. 2 indicates the influence of the original pH value on the removal rate of the target pollutants, from which, it is known that in conditions of a ratio of a molar concentration of $H_2O_2$ to a molar concentration of the sweetener of being 10:1 and 30 min of irradiation by the mercury lamp having a working power of 22 Watt, the removal rates of the sweeteners using the advanced oxidation processes process in the groups having the original pH value of the solution of between 3 and 5 were better than the groups having the original pH value of the solution of greater than or equal to 7.

Figure 3:
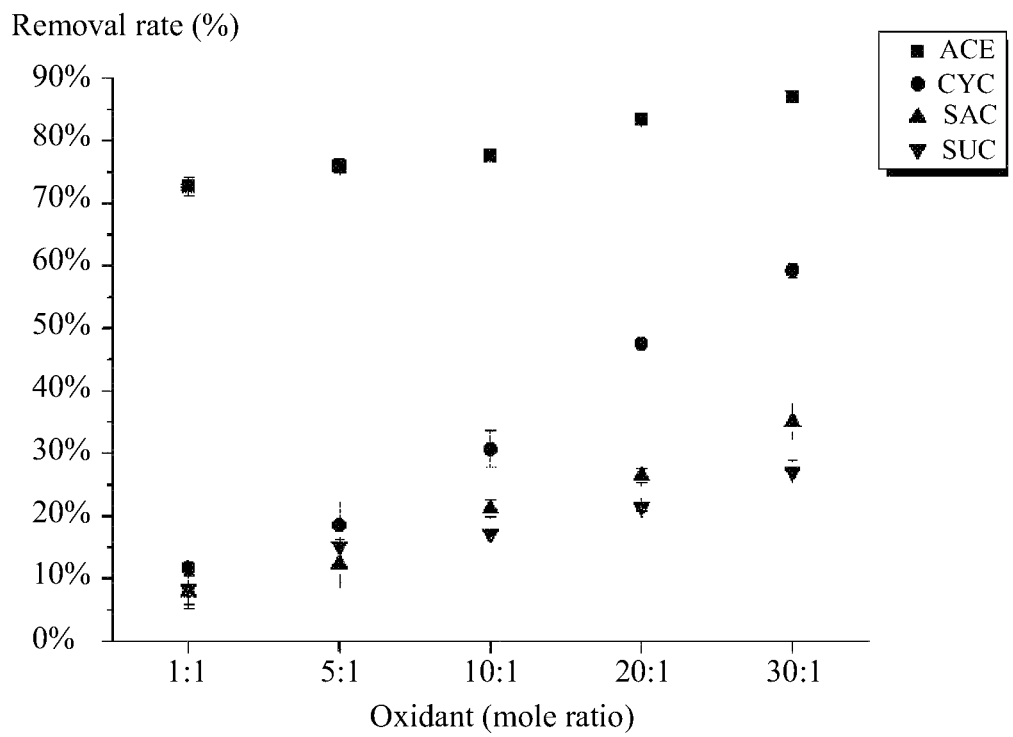
FIG. 3 illustrates influences of a concentration of an oxidant on degradation effects of sweeteners in accordance with one embodiment of the invention.

2. Influences of a Ratio of a Molar Concentration of $H_2O_2$ to a Molar Concentration of the Sweetener on Removal Rate of Target Pollutants As shown in FIG. 3, in condition of the pH value being equal to 5, 30 min of irradiation the mercury lamp having a working power of 22 Watt, and a ratio of a molar concentration of $H_2O_2$ to a molar concentration of the sweetener of being between 1:1 and 30:1, removal rates of all the target pollutants increase with the increment in the concentration of the oxidants. Generally, when the concentration of $H_2O_2$ is too large, $H_2O_2$ contacts with the produced .OH for reaction therefore consumes the .OH. Thus, an optimized value might exist in the addition of the oxidant. However, all the four sweeteners are substances difficult to be decomposed. With the increment of the addition of the oxidant, the removal rate gradually increases. Considering the practical operation of the process, an optimum addition of the oxidant satisfies a ratio of a molar concentration of $H_2O_2$ to a molar concentration of the sweetener of being 20:1.

3. Influences of Irradiation Intensity of Light Source on Removal Rate of Target Pollutants Two common ultraviolet light sources in the ultraviolet-based advanced oxidation processes process were selected, which were respectively mercury lamp having a working power of 22 Watt and mercury lamp having a working power of 300 Watt. Removal rates of the target pollutants in condition of the pH value of 5, an addition of the oxidant satisfying a ratio of a molar concentration of $H_2O_2$ to a molar concentration of the sweetener of being 10:1, and a photoreaction time of 30 min were illustrated in Table 3. When the mercury lamp having the working power of 22 Watt was adopted, the degradation effects on the four sweeteners were better.

TABLE 3

Comparison of degradation effects of sweeteners between two light sources

| Luminous power of mercury lamp | Acesulfame potassium | Cyclamate | Saccharin sodium | Sucralose |
|---|---|---|---|---|
| 22 W | 77.64 ± 0.1% | 30.68 ± 2.95% | 21.16 ± 1.34% | 17.03 ± 2.53% |
| 300 W | 55.01 ± 0.51% | 26.38 ± 0.1% | 17.61 ± 0.55% | 10.93 ± 0.83% |

Figure 4:
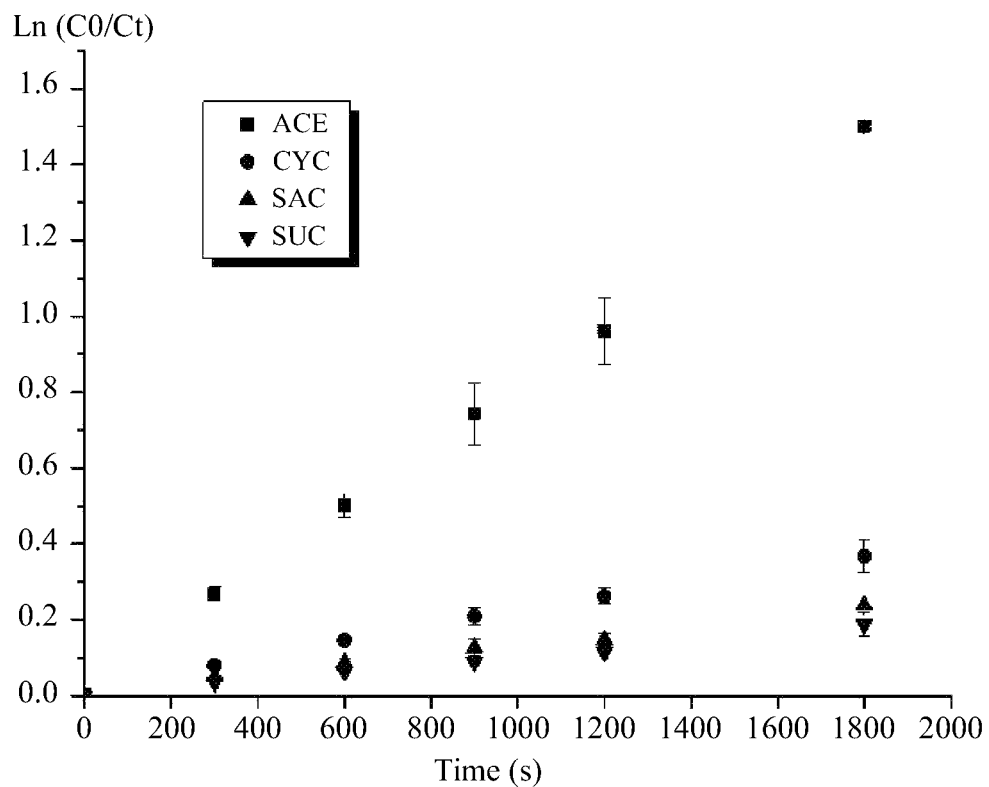
FIG. 4 illustrates influences of an irradiation time on decomposition of four sweeteners in accordance with one embodiment of the invention.

4. Influences of Irradiation Time of Ultraviolet Light on Removal Rate of Target Pollutants FIG. 4 illustrates the influences of irradiation time of the ultraviolet light on the removal rate of the target pollutants, from which, it is known that decomposition reactions of the four sweeteners all follow first order reaction kinetics, and reaction rate constant k is between $1\times 10^{-4}$ and $8\times 10^{-4}$ $s^{-1}$. Reaction rate of acesulfame potassium is the fastest due that acesulfame potassium is able to be decomposed by absorbing photons under the irradiation of the UV light while the other three sweeteners are not. When comparing the reaction rate of the four pollutants, acesulfame potassium>cyclamate>saccharin sodium>sucralose. Sucralose is a strongly persistent organic substance. When using $UV/H_2O_2$ process to decompose the artificial sweeteners, the reaction rate of sucralose is the lowest.

In summary, the method of the invention is effective to degrade the artificial sweeteners from the sewage.

It also demonstrated from the treatment results analyses that the components and the parameters are both best choices to realize the method of the invention.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for degrading artificial sweeteners from sewage, the method comprising:
    1) allowing sewage to flow in a secondary sedimentation tank by gravity, and precipitating sediments of the sewage in the secondary sedimentation tank;
    2) collecting a supernatant from the secondary sedimentation tank, adding a NaOH solution or a perchloric acid solution to regulate the pH value of the supernatant to be between 3 and 11; adding a 30% w/w aqueous H2O2 solution to the supernatant to adjust a ratio of a molar concentration of H2O2 to a molar concentration of the sweetener to be between 1:1 and 30:1; transferring the resulting mixed solution to a photoreactor, irradiating the mixed solution by ultraviolet light having a working power of 22 or 300 Watt, and stirring the mixed solution for between 5 and 30 min; and adding a 1.5% w/w aqueous NaNO2 solution to the mixed solution; and
    3) collecting and analyzing an effluent obtained from 2), introducing the effluent to a disinfecting tank and disinfecting the effluent with ClO2, and discharging an effluent from the disinfecting tank to an urban sewage system.

2. The method of claim 1, wherein the photoreactor of 2) is made of organic glass; a quartz sleeve is vertically disposed in a center of the photoreactor; and an ultraviolet lamp is placed in the quartz sleeve.

3. The method of claim 2, wherein a mercury lamp having a working power of 22 Watt is adopted in 2), and a radiation intensity of the ultraviolet light at a wavelength of 254 nm on an outer wall of the quartz sleeve is 0.52 $\mu W/cm^2$.

4. The method of claim 1, wherein in 2), concentrations of the NaOH solution and the perchloric acid solution each are 0.5 mol/L.

5. The method of claim 1, wherein in 2), the pH value of the supernatant is initially regulated to be 5.

6. The method of claim 1, wherein in 2), the ratio of the molar concentration of $H_2O_2$ to the molar concentration of the sweetener is 20:1.

7. The method of claim 1, wherein in 2), the mixed solution is stirred under the ultraviolet light for 30 min.

* * * * *